United States Patent [19]

Sigwalt et al.

[11] 4,105,713
[45] Aug. 8, 1978

[54] POLYMERS AND COPOLYMERS OF INDENE

[75] Inventors: Pierre Sigwalt, St. Michel-sur-Orge; Alain Polton, Paris; Cécile Baudin, Kremlin Bicetre; Mihajlo (Michel) Miskovic, Paris, all of France

[73] Assignee: Agence Nationale de Valorisation de la Recherche (ANVAR), Neuilly-sur-Seine, France

[21] Appl. No.: 631,991

[22] Filed: Nov. 14, 1975

[30] Foreign Application Priority Data

Nov. 18, 1974 [FR] France .................................. 74 37856

[51] Int. Cl.$^2$ ..................... C08F 279/02; C08F 259/02
[52] U.S. Cl. ................................. 260/879; 260/878 R
[58] Field of Search ............................ 260/878 R, 879

[56] References Cited

U.S. PATENT DOCUMENTS 3,904,708  9/1975  Kennedy et al. ................. 260/880 R

OTHER PUBLICATIONS

Copolymerization by GE, HAM, Interscience, New York (1964), pp. 286–287.

*Primary Examiner*—William F. Hamrock
*Attorney, Agent, or Firm*—Hammond & Littell

[57] ABSTRACT

Elastomers with thermoplastic properties consist of polymers grafted on an elastomeric chain which includes double bonds and active sites. The latter are more particularly halogen atoms, especially chlorine, and the grafted polymer is a polyindene or a copolymer of indene with styrene derivatives, such as α-methylstyrene or para-alkyl-styrene. In the process for preparing these thermoplastic elastomers the choice of constituent proportions, catalyst and solvent is important. Elastomers possessing at 80° C a breaking strength of at least 60 kg/cm$^2$ can be obtained.

17 Claims, No Drawings

POLYMERS AND COPOLYMERS OF INDENE

BACKGROUND OF THE INVENTION

1. Field of the Invention

The present invention relates to polymers and copolymers of indene and more particularly to polymers and copolymers of indene grafted on to elastomeric chains containing double bonds and bearing reactive sites, and to the processes for their production.

It is known that cationic polymerisations can be initiated by carbonium ions formed by the reaction of a metal halide with an alkyl halide such as an alkyl chloride. If a halogenated polymer is used instead of the alkyl chloride, a polymer is obtained containing carbonium ions which can initiate the polymerisation of a suitable monomer, which can, if necessary, be grafted in its turn on to the elastomer chain.

These reactions have been the subject of numerous studies, notably by reason of the importance of the copolymers obtained which can be, according to the elastomers and the monomers selected, thermoplastic elastomers.

2. Description of the Prior Art

In the "Journal of Polymer Science" (Part. A-1, 4,1665 (1966) the grafting by cationic polymerisation of styrene on to chlorobutyl rubber, in cyclohexane solution is described; the catalyst used is $SnCl_4$, and the reaction temperature is 20° C. The percentage of grafting can be increased by raising the concentration of styrene and of $SnCl_4$ or by the addition of a polar solvent such as nitrobenzene. The concentration of chlorinated elastomer is without influence on the grafting but plays a role in the degree of polymerisation.

British Pat. No. 1,174,323 provides a process of grafting numerous monomers by cationic polymerisation on various halogenated elastomers, the catalyst being of the formula $Al(M)_2R$ in which M represents an alkyl radical and R is a halogen or hydrogen; the co-catalyst is the halogenated polymer itself. According to the description of this patent, the monomers usable are notably styrene and its derivatives, as well as a large number of monomers polymerisable by the cationic route, mentioned in a general treatise to which reference is made.

The process of British Pat. No. 1,174,323 enables the production of the graftings described with certain monomers, notably styrene, which permits the obtaining of interesting results, but many of the monomers mentioned cause the formation of polymers which are either brittle or of low molecular weight or difficult to use, as is the case with propylene or the higher alkenes, α- or β-methylstyrene, or do not enable polymerisation to be achieved, such as ethylene, diphenyl-1,1-ethylene, stilbene or indole, among others.

The teachings of the aforementioned patent hence do not enable the syntheses provided to be carried out from all the constituents that it mentions.

OBJECTS AND SUMMARY OF THE INVENTION

It is an object of the present invention to provide a process for obtaining elastomers with thermoplastic properties, characterised by the bringing together under conditions of cationic polymerisation of a macromolecular constituent with an elastomeric chain including double bonds and reactive sites, the latter being more particularly halogen atoms, especially chlorine, and a monomeric constituted adapted to be polymerised, selected from among indene and mixtures of indene with a styrene derivative, such as α-methylstyrene or a para-alkylstyrene.

It is another object of the invention to provide thermoplastic elastomers with improved mechanical properties.

The process of the invention enables surprisingly the polymerisation or the co-polymerisation of indene to be effected in the presence of elastomers containing double bonds and bearing reactive sites, such as halogenated elastomers, for example, chlorobutyl rubber (chlorinated butyl rubber).

According to the invention, it has been discovered that such polymerisation is only possible by respecting in precise manner certain experimental conditions and by means of a choice of solvents and of catalysts as well as the respective proportions of each constituent.

The process according to the invention enables the preparation, from cheap materials, of thermoplastic elastomers having, at high temperature, improved properties in comparison with those of butadiene-styrene block copolymers. It is known, in fact, that thermoplastic elastomers have the advantage of being able to be put to use without vulcanisation by the usual processing techniques of thermoplastic materials.

They are constituted by blocks of an elastomer and blocks of a thermoplastic material. The latter ensure, at the temperature of use, physical cross-linking consequent upon the formation of thermoplastic domains in the midst of an elastomeric matrix. These domains play the same role as chemical bonds in conventional vulcanisation.

Such materials, available commerically, are already known. They are block copolymers of the structure S-B-S, S being a thermoplastic block (polystyrene) and B an elastomeric block (polybutadiene). These products have however the drawback of not being utilisable at temperatures higher than 70° C by reason of creep of the polystyrene. According to the invention, there are used, as constituent of the thermoplastic phase, polymers whose glass transition temperature is higher than that of polystyrene, in particular polyindene and copolymers of indene with styrene derivatives, such as α-methyl-styrene and the para-alkyl styrene.

As has been previously mentioned, this grafting is carried out by the cationic route. This grafting depends on the fact that under certain experimental conditions, the initiation of polymerisation can only occur in the presence of a co-initiator, for example an alkyl chloride which supplies the required positive group:

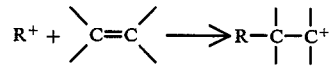

It is possible to use as a co-initiator, an elastomer bearing reactive sites, in particular chlorobutyl rubber whose allylic chlorine atoms are very reactive. The reaction at these sites leads to the formation of a macromolecular polycation capable of initiating the polymerisation of indene and of leading of the fixing of grafts. The reaction may be portrayed diagrammatically as follows:

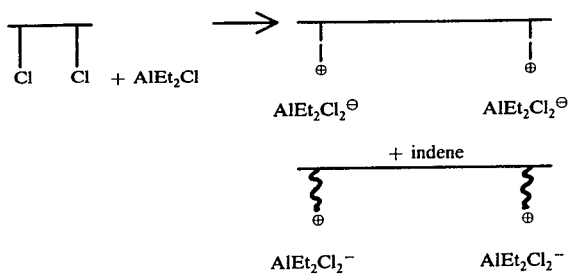

The polyindene chains are shown by the wavy line.

To obtain interesting materials the grafting yields must be quantitative and there must not be a homopolymer. In fact, only the presence of ungrafted elastomer or having only a single graft is harmful since such a macromolecule constitues an un-cross-linked pendant chain. The presence of a certain proportion of thermoplastic homopolymer, without being desirable, has less influence on the mechanical properties since it participates in the formation of thermoplastic domains.

The process of the invention is applied to grafting on elastomeric chains bearing reactive sites, especially halogen atoms and more advantageously again chlorine atoms. A particularly advantageous example is chlorobutyl rubber. Other types of elastomers may be used, selected so as to eliminate secondary reactions, for example copolymers of monoolefines, subsequently halogenated, obtained notably from ethylene, from propylene or from 1-butene.

By suitable selection of the experimental conditions, it has been possible to prepare poly(chlorobutyl-g-indene) and poly(chlorobutyl-g-indene-co-α-methyl styrene) with a grafting yield of 100%. The product obtained contains neither thermoplastic homopolymer nor ungrafted elastomeric chains.

It has thus been found that, all things being otherwise equal, the yield and initial speed of polymerisation increase with the concentration of monomer, but this concentration of monomer is limited as to the higher values by the appearance of cross-linking which renders the polymer obtained insoluble. By way of example, for a concentration of monochlorodiethylaluminum equal to about $8.10^{-4}$ moles/l, a ratio (Cl)/(Al) equal to about 11, [(Cl)/(Al) represents the number of chlorine atoms of the chlorobutyl rubber per molecule of initiator], a yield of grafted polyindene of the order of 100% is obtained for a concentration of indene equal to about 0.11 mole/l. The reaction is carried out at $-50°$ C in a mixture of equal volumes of methylene chloride and methylcyclohexane.

It has also been found that, for given concentrations of indene and of monochlorodiethylaluminum, the yield of polyindene increases, when the concentration of chlorobutyl rubber increases, up to a limit beyond which the yield and the initial speed of polymerisation vary no further. By way of example, for a concentration of indene equal to 0.11 mole/l and a concentration of catalyst equal to about $8.10^{-4}$ mole/l, the yield is equal to about 100% for a concentration of chlorobutyl rubber equal to about 10 to 20 g/l. The reaction conditions were those previously defined.

It has also been found that the initial speed of polymerisation and yield of polyindene increase with the concentration of initiator. Thus, for a concentration of indene equal to 0.11 mole/l and a concentration of chlorobutyl rubber equal to 20 g/l, no polymerisation occurs when the concentration of monochlorodiethylaluminum is less than $5.10^{-5}$ mole/l, which may be due to destruction of active centers by impurities in the rubber.

The yield in polyindene then increases rapidly as a function of the initial concentration of initiator and becomes complete as soon as the latter reaches $4.10^{-4}$ mole per liter. It is also an object of the present invention to provide a process of manufacturing a poly(-chlorobutyl-g-indene-co-α-methylstyrene).

In the prior art, the polymerisation of α-methylstyrene has been effected, but this monomer employed alone leads to low molecular weights of $-50°$ C and the product is apparently useless (it is described as "brittle"). Moreover, this polymer runs the risk of depolymerisation at the moulding temperature (for this reason there has been no industrial development of the homopolymer).

The copolymerisation of α-methylstyrene with indene is described in the French Pat. No. 1,235,546.

It has now been found that the replacement of the polyindene by a copolymer of indene and α-methylstyrene offers, among other advantages, that of lowering the temperature of operation which avoids degradation reactions during moulding. The poly(chlorobutyl-g-indene-co-α-methylstyrenes) have good mechanical properties at normal temperature and preserve them in part up to 100° C.

The polymerisations and copolymerisations of the indene are carried out in a solvent medium. This solvent or these mixtures of solvent are selected so that they enable operation at sufficient concentrations and under conditions which do not favor transfer reactions, that is to say at low temperature and in a medium of fairly high dielectric constant. One must also take into account the fact that the lowering of temperature enables the degradation of the prepolymer chain by the initiators to be reduced, but the increase in the dielectric constant has the reverse effect. A dielectric constant of the order of 5 to 6 is particularly suitable.

This or these solvents must solubilise the polyindene or the polyindene-co-poly-α-methylstyrene copolymer.

By way of example a particularly advantageous solvent mixture may be mentioned, constituted by a mixture of equal volumes of methylene chloride and of methylcyclohexane, hexane, or heptane.

The useful initiators according to the present invention are the Lewis acids such as, for example, $SnCl_4$, $TiCl_4$ or $AlCl_3$ or alkylaluminum compounds if necessary halogenated such as triethylaluminum or monochlorodiethylaluminum, the latter compound being particularly preferred.

The polymerisations are carried out preferably at low temperature but can take place in a temperature range comprised between $-80°$ C and $0°$ C. It is preferably situated between approximately $-50°$ C and $-20°$ C; the raising of the temperature facilitates transfers.

The reactions take place preferably under vacuum, but can be carried out at atmospheric pressure under an inert atmosphere.

The reactants used should be capable of purification so as to remove from the reaction medium possible coinitiator agents (water, hydrochloric acid, etc...). The purification is advantageously carried out according to the processes described in: J. Polym. Sci. 58, 911 (1962); M. Fontanille, Thèse Paris (1967); R. Cheradame, Thèse Paris (1966) and Eur. Polym. J. 9, 375 (1973); A. Polton and P. Sigwalt, Bull. Soc. Chim. Fr. 131 (1970).

The extraction of the polymers and copolymers obtained may be effected to check the composition of the product, but it will often be unnecessary in practice, the grafting yield being in the vicinity of 100%.

According to another aspect of the invention there are provided elastomers with thermoplastic properties consisting of polymers grafted on to an elastomeric chain, characterised in that the elastomeric chain comprises double bonds and active sites and that the grafted polymer is a polyindene or a copolymer of indene with styrene derivatives, such as α-methyl styrene or a para-alkylstyrene.

The grafted polymer is advantageously a copolymer of indene and of α-methylstyrene.

DESCRIPTION OF PREFERRED EMBODIMENTS

The following examples are intended to illustrate the process of polymerisation according to the invention, to show that this process can only be put into operation under very precise reaction conditions. In all these tests, operation was at a temperature of $-50°$ C in a mixture of methylene chloride and methyl cyclohexane in equal volumes. The initial amount of chlorobutyl rubber (ESSO BUTYL H. T. 10-66) is 20 g $l^{-1}$ in all these experiments.

TABLE I

Influence of monomer concentration

| $AlEt_2Cl$ mole $l^{-1}$ | Indene mole $l^{-1}$ | $\frac{(Cl)}{(Al)}$ | Yield of Polyindene | Nature of the Polymer |
|---|---|---|---|---|
| $7.7 \times 10^{-4}$ | 0.054 | 11.7 | 74% | Soluble |
| $8.4 \times 10^{-4}$ | 0.107 | 10.7 | 100% | Soluble |
| $8.3 \times 10^{-4}$ | 0.108 | 10.8 | 100% | Soluble |
| $8.2 \times 10^{-4}$ | 0.109 | 11 | 93% | Soluble |
| $7.5 \times 10^{-4}$ | 0.164 | 11.8 | 100% | Cross-linked |
| $9.5 \times 10^{-4}$ | 0.22 | 9.35 | 28% | Cross-linked |

TABLE II

Influence of concentration of elastomer

| $AlEt_2Cl$ mole $l^{-1}$ | Rubber g $l^{-1}$ | Indene mole$^{-1}$ | $\frac{(Cl)}{(Al)}$ | Yield of Polyindene |
|---|---|---|---|---|
| $8.1 \times 10^{-4}$ | 0.5 | 0.109 | 0.28 | 56% |
| $9 \times 10^{-4}$ | 0.5 | 0.109 | 0.26 | 52% |
| $8 \times 10^{-4}$ | 2 | 0.11 | 1.1 | 48% |
| $7.7 \times 10^{-4}$ | 5 | 0.108 | 2.9 | 79% |
| $8 \times 10^{-4}$ | 10 | 0.107 | 5.6 | 98% |
| $7.5 \times 10^{-4}$ | 15 | 0.107 | 8.86 | 90% |
| $8.4 \times 10^{-4}$ | 20 | 0.107 | 10.7 | 100% |
| $8.3 \times 10^{-4}$ | 20 | 0.108 | 10.8 | 100% |
| $8.2 \times 10^{-4}$ | 20 | 0.109 | 11 | 93% |

TABLE III

Influence of concentration of initiator

| $AlEt_2Cl$ mole $l^{-1}$ | Indene mole $l^{-1}$ | $\frac{(Cl)}{(Al)}$ | Yield of Polyindene |
|---|---|---|---|
| $5 \times 10^{-5}$ | 0.108 | 180 | 0% |
| $3.1 \times 10^{-4}$ | 0.108 | 29 | 40% |
| $4 \times 10^{-4}$ | 0.108 | 22 | 100% |
| $8.2 \times 10^{-4}$ | 0.109 | 11 | 93% |
| $8.3 \times 10^{-4}$ | 0.108 | 10.8 | 100% |
| $8.4 \times 10^{-4}$ | 0.107 | 10.7 | 100% |
| $5 \times 10^{-3}$ | 0.108 | 1.8 | 98% |
| $5 \times 10^{-3}$ | 0.104 | 1.72 | 95% |
| $5 \times 10^{-3}$ | 0.11 | 1.8 | 100% |

The thermoplastic properties of the compounds obtained according to this process have already been mentioned, the following comparative mechanical tests are intended to illustrate the particular properties of some polymers.

TABLE IV

Mechanical Properties at Ordinary Temperature of Some Thermoplastic Elastomers (moulding by compression)

| Composition of the copolymer | | | | | |
|---|---|---|---|---|---|
| Elastomeric Phase butyl rubber (%) | Thermoplastic Phase indene % | αMe-Styr % | Temperature of operation | Breaking strength kg/cm$^2$ | Elongation at rupture % |
| 75 | 25 | 0 | 240 | 38 | 593 |
| 60 | 40 | 0 | 240 | 57 | 249 |
| 60 | 40 | 0 | 230 | 92 | 305 |
| 60 | 30 | 10 | 230 | 110 | 187 |
| 60 | 22 | 18 | 190 | 131 | 351 |

TABLE V

COMPARISON OF THE MECHANICAL PROPERTIES OF SOME THERMOPLASTIC ELASTOMERS

| Copolymer | Breaking Strength (kg/cm$^2$) | Elongation at rupture % |
|---|---|---|
| "KRATONS" (butadiene styrene copolymers) | 56–210 | 550–1,350 |
| Polyethylene-butylrubber copolymers | 35–130 | 450–500 |
| Polyolefines | 52.5–140 | 150–320 |
| p-Indene-chlorobutyl rubber 40/60 | 82–101 | 290–320 |
| p- α-methyl styrene -p-indene chlorobutyl rubber 17/23/60 | 90–130 | 380 |

TABLE VI

VARIATION OF THE MECHANICAL PROPERTIES OF THE COPOLYMERS ACCORDING TO TEMPERATURE

| Composition of the Copolymer | Measurement Temperature | Breaking Strength (kg/cm$^2$) | Elongation at Rupture % |
|---|---|---|---|
| p-Indene -chlorobutyl rubber 40/60 | 20 | 98 | 203 |
| | 60 | 40 | 40 |
| | 80 | 30 | 27 |
| p- α-methyl styrene-p-indene--chlorobutyl rubber 17/23/60 | 25 | 90–130* | 380 |
| | 80 | 65 | 390 |
| | 100 | 50 | 330 |

*According to the specimens

Indene-p-chlorobutyl rubber studied in Table VI was manufactured at $-50°$ C under vacuum in 625 cm$^3$ of a mixture of equal volumes of methylene chloride and of methylcyclohexane. 12.5g of chlorobutyl rubber of the "ESSO BUTYL H. T 10-66" type, 8.6 cm$^3$ of indene and $1.3 \cdot 10^{-3}$ moles of monochlorodiethylaluminum were used. The conversion into polyindene was quantitative.

The α-methyl styrene-p-indene-p-chlorobutyl rubber copolymer was manufactured at $-50°$ C under vacuum in 980 cm$^3$ of a mixture of equal volumes of methylene chloride and of methylcyclohexane. 20g of chlorobutyl rubber, 7.6 cm$^3$ of indene, 5.35 cm$^3$ of α-methyl styrene and $2.10^{-3}$ moles of monochlorodiethylaluminum were used. The conversion of the two monomers into grafted copolymer was quantitative.

0.12% of an antioxidant was added to these compositions for moulding the test specimens.

According to the invention the ratio of the one or more monomers to the elastomer is comprised by weight between 25 : 75 and 50 : 50, preferably between 35 : 65 and 45 : 55 and more specifically is equal to 40 : 60 in the case of the grafting of polyindene.

The particular embodiments show that the invention provides elastomers with thermoplastic properties consisting of polymers of polyindene grafted on to chlorobutyl rubber, said elastomers possessing a breaking strength at 80° C greater than or equal to 30 kg/cm² and also good mechanical behaviour at 100° C.

It can be seen that the invention also provides elastomers with thermoplastic properties consisting of copolymers of indene and of α-methylstyrene grafted on to chlorobutyl rubber, said elastomers possessing at 80° C a breaking strength higher than or equal to 60 kg/cm² and also good mechanical behaviour at 100° C.

It will be noted that the products obtained by grafting copolymers of indene and of α-methylstyrene possess particularly advantageous properties. In fact, their breaking strength remains high even at temperatures above 80° C, whereas, under similar conditions, products including grafts of polystyrene become completely useless.

The products of the invention being thermoplastic elastomers, they may be shaped and moulded like ordinary thermoplastics. From this point of view, the copolymers of indene are also interesting since they can be applied at a lower temperature than the homopolymers of indene.

It will be apparent to the technician skilled in the art that various modifications can be made in the embodiments of the process and products according to the invention described hereabove, without departing from the scope of the invention. Such modifications are to be regarded as falling within the scope of the appended claims.

We claim:

1. Elastomers with thermoplastic properties consisting of a chlorobutyl rubber elastomeric chain having graft polymerized thereon a mixture of indene and a styrene derivative selected from the group consisting of α-methyl styrene and para-alkylstyrene.

2. Elastomers with thermoplastic properties according to claim 1, wherein the grafted polymer is a polymer of indene and α-methylstyrene.

3. Elastomers with thermoplastic properties according to claim 1 wherein the ratio of the monomers of the grafted polymers to the elastomeric chain is comprised by weight between 25:75 and 50:50.

4. Elastomers with thermoplastic properties according to claim 3, wherein said ratio is between 35:65 and 45:55.

5. Elastomers with thermoplastic properties according to claim 1, consisting of copolymers of indene and of α-methlstyrene grafted on to chlorobutyl rubber, said elastomers possessing at 80° C a breaking strength greater than or equal to 60 kg/cm².

6. Process for producing elastomers with thermoplastic properties, wherein monomer mixtures of indene and a styrene derivative selected from the group consisting of α-methyl styrene and para-alkylstyrene are graft polymerized onto chlorobutyl rubber, comprising reacting a chlorobutyl rubber and a monomeric mixture of indene and said styrene derivative at a temperature between −80° C and 0° C in a solvent for the reactants and in the presence of an initiator for cationic polymerizations and under vacuum or at atmospheric pressure under an inert atmosphere.

7. Process according to claim 6, wherein copolymers of indene are grafted and the reaction temperature is comprised between −50° and −20° C.

8. Process according to claim 6, wherein the reaction is carried out in a mixture of solvents, in which the elastomeric chain constituent is soluble at the reaction temperature, said mixture including a hydrocarbon and a halogen derivative of a hydrocarbon.

9. Process according to claim 8, wherein said solvent mixture is a mixture of equal volumes of methylcyclohexane and methylene chloride.

10. Process according to claim 6, wherein the ratio of the monomers of the grafted polymers to the elastomeric chain is comprised by weight between 25:75 and 50:50.

11. Process according to claim 10, wherein said ratio is between 35:65 and 45:55.

12. Process according to claim 6, wherein an initiator is used which is a Lewis acid, an alkylaluminum compound or a halogenated alkylaluminum compound.

13. Process according to claim 12, wherein said Lewis acid is $SnCl_4$, $TiCl_4$ or $AlCl_3$.

14. Process according to claim 12, wherein said initiator is triethylaluminum.

15. Process according to claim 12, wherein said initiator is monochlorodiethylaluminum.

16. Process according to claim 6, wherein the grafted copolymer is indene-α-methylstyrene copolymer and the concentration of the chlorobutyl rubber is greater than 10g per liter with respect to the reaction mixture, the concentration of initiator is comprised between $5.10^{-4}$ mole/liter and $5.10^{-3}$ mole/liter, the initiator used being monochlorodiethylaluminum, the grafting yield then being quantitative.

17. Process according to claim 6 wherein the ratio by weight of the monomers to the chlorobutyl rubber is such that the elastomer produced has at 80° C a breaking strength greater than or equal to 60 kg/cm².

* * * * *